United States Patent [19]

Fink

[11] 4,338,788

[45] Jul. 13, 1982

[54] COGENERATION PROCESS LINKING FCC REGENERATOR AND POWER PLANT TURBINE

[75] Inventor: Allen H. Fink, Des Plaines, Ill.

[73] Assignee: UOP Inc., Des Plaines, Ill.

[21] Appl. No.: 171,225

[22] Filed: Jul. 22, 1980

[51] Int. Cl.³ .............................................. F01K 17/00
[52] U.S. Cl. ..................... 60/648; 60/39.02; 60/676
[58] Field of Search ............. 60/648, 39.02, 39.12, 60/39.18 C, 676; 252/417

[56] References Cited

U.S. PATENT DOCUMENTS

| | | | |
|---|---|---|---|
| 3,198,750 | 8/1965 | Callahan et al. | 252/456 |
| 3,200,081 | 8/1965 | Callahan et al. | 252/443 |
| 3,230,246 | 1/1966 | Callahan et al. | 260/465.3 |
| 3,489,673 | 1/1970 | Stine et al. | 208/73 |
| 3,525,218 | 8/1970 | Buss | 60/39.02 |
| 3,536,609 | 10/1970 | Stine et al. | 208/72 |
| 3,563,911 | 2/1971 | Pfeiffer et al. | 252/417 |
| 3,765,167 | 10/1973 | Rudolph et al. | 60/39.02 |
| 3,819,679 | 6/1974 | Sheely | 260/465.3 |
| 3,868,817 | 3/1975 | Marion et al. | 60/39.02 |
| 3,892,794 | 7/1975 | Grasselli et al. | 260/465.3 |
| 3,909,392 | 9/1975 | Horecky, Jr. et al. | 208/120 |
| 4,006,075 | 2/1977 | Luckenbach | 208/164 |
| 4,051,013 | 9/1977 | Strother | 208/78 |
| 4,081,508 | 3/1978 | Luckenbach | 252/417 X |
| 4,197,189 | 4/1980 | Thompson et al. | 208/164 |
| 4,198,287 | 4/1980 | Hemler, Jr. et al. | 208/113 |

*Primary Examiner*—Allen M. Ostrager
*Assistant Examiner*—Stephen F. Husar
*Attorney, Agent, or Firm*—James R. Hoatson, Jr.; John F. Spears, Jr.; William H. Page, II

[57] ABSTRACT

An air supply system for the catalyst regeneration zone of a fluidized catalytic cracking unit also supplies a pressurized air stream to the turbine of an electrical generating plant. The compressor which produces the pressurized air stream is driven by passing the flue gas of the regeneration zone through a power recovery expander. Preferably, the pressurized air stream is first heated by heat exchange against the turbine effluent and then admixed with hot gas from separate turbin-type gas generators prior to being passed into the turbine. This provides a very practical and relatively low-cost cogeneration process.

13 Claims, 1 Drawing Figure

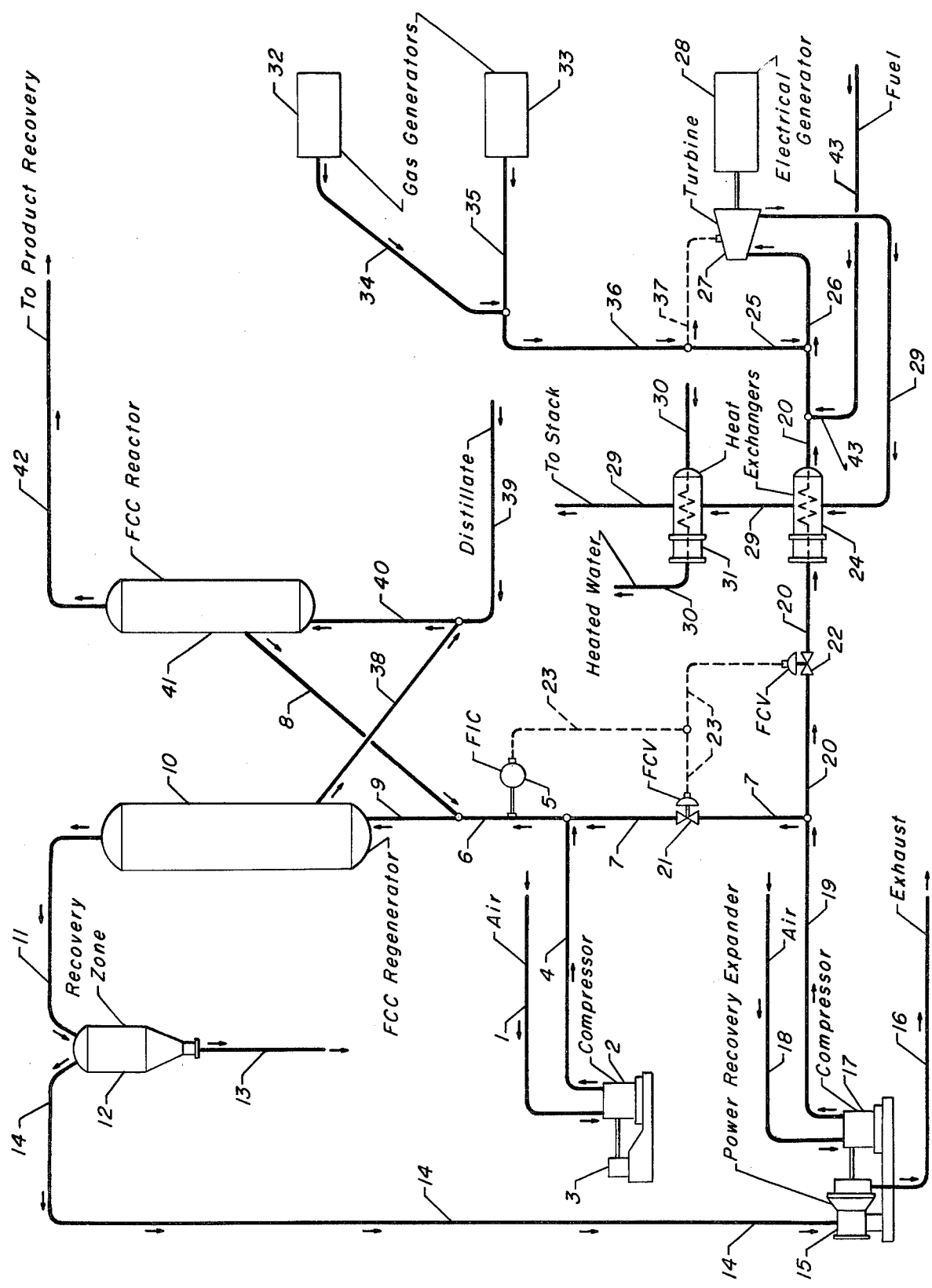

COGENERATION PROCESS LINKING FCC REGENERATOR AND POWER PLANT TURBINE

FIELD OF THE INVENTION

The invention relates to an air supply system for the regenerator of a fluidized catalytic cracking unit used in a petroleum refinery. The invention also relates to a process for generating electrical energy in which an electrical generator is rotated by a turbine driven by a hot gas stream and a pressurized air stream which was compressed using energy provided by the power recovery unit of a fluidized catalytic cracking unit. The invention specifically relates to a cogeneration process in which a petroleum refinery is linked to an electrical utility's power station through an interruptable pressurized air stream delivered to the power station from the refinery.

PRIOR ART

Fluidized catalytic cracking units are in very widespread commercial use and are found in most major refineries. They are described in U.S. Pat. Nos. 4,051,013; 3,536,609; 4,006,075; 3,489,673; 3,563,911 and 3,909,392. A description of the development of FCC units and a comparison of various designs are found respectively in the articles at page 102 of the May 15, 1972 edition of *The Oil and Gas Journal* and at page 65 of the Oct. 8, 1973 edition of *The Oil and Gas Journal*. A more recent article on FCC operation and which includes a diagram of the flow of regenerator flue gas through a power recovery unit is presented at page 63 of the May 22, 1978 edition of *The Oil and Gas Journal*.

Recovering energy from the flue gas stream of the FCC regenerator through the use of a power recovery expander is well-known and is performed commercially. The economics of this is discussed and a flow diagram of the power recovery system is provided in an article at page 164 of the Nov. 19, 1979 edition of *The Oil and Gas Journal*. Regenerator flue gas power recovery systems are also described in U.S. Pat. Nos. 3,076,769; 3,104,227 and 3,247,129 (all Cl. 252-417). U.S. Pat. No. 3,401,124 also presents a flue gas power recovery system using an expander turbine. This reference shows the generation of electrical energy by depressurizing flue gas through a turbine, which drives an electrical generator and an air compressor.

U.S. Pat. No. 4,163,364 (Cl. 60-39.02) presents a process in which electrical energy is recovered by passing the exhaust gas of a blast furnace through a turbine. U.S. Pat. No. 4,109,469 (Cl. 60-676) describes a process in which a petroleum refinery is linked to an off-site electric generating facility. Vapors formed by indirect heat exchange against one or more waste heat streams of the refinery are depressurized in a turbine connected to an electrical generator.

SUMMARY OF THE INVENTION

The invention provides a cogeneration process which links together the air supply system of a fluidized catalytic cracking unit regeneration zone with a gas driven turbine of an electric utility. A broad embodiment of the invention may be characterized as a process for generating electrical power which comprises the steps of producing a pressurized air stream by compressing air to a superatmospheric pressure in a compressor driven by a power recovery expander which receives as a motive stream the flue gas stream of the catalyst regeneration zone of a fluidized catalytic cracking unit; heating the pressurized air stream by indirect heat exchange against a hereinafter characterized turbine effluent stream; and then passing the pressurized air stream and a high temperature gas stream through a turbine which drives an electrical generator and thereby producing the previously referred to turbine effluent stream. In an alternative embodiment the pressurized air stream is directly heated in a supplemental combustor after being heated by indirect heat exchange.

BRIEF DESCRIPTION OF THE DRAWING

The Drawing is a simplified diagram which shows the flue gas stream of the FCC regenerator 10 carried by line 11 being passed through a power recovery expander 15 which drives a standby air compressor 17 located in a refinery. A pressurized air stream from this compressor is heated in heat exchanger 24 and then passed into the turbine 27 as a supplemental motive stream. This stream and the hot gas stream from line 36 rotate the turbine which in turn rotates the generator 28 of the electrical utility. If the main air compressor 2 of the refinery fails, pressurized air is supplied to the FCC regenerator zone through line 7.

DETAILED DESCRIPTION

The escalating costs of energy have increased the feasibility of new designs and practices which provide more efficient recovery and utilization of fossil fuel energy. One area which has received increased attention is the establishment of cogeneration facilities. A cogeneration facility is a complex in which a power plant, typically an electric generating plant, is linked with an industrial facility such as a petrochemical complex or a petroleum refinery. The objective of this linkage is to increase the overall efficiency of the utilization of energy in the components of the complex through the distribution of various forms of low level energy in a manner which allows their greater utilization. Energy which is available in one part of the facility in a form which renders its use impractical is transferred to a different part of the complex in which it may be at least partially recovered. For instance, low pressure steam which is being discharged from the turbine of an electric power generating station may be transported to an industrial facility at which it is condensed during the heating of a process stream circulated within this facility. Cogeneration is also often characterized as the simultaneous production of mechanical and thermal energy.

One very important criteria in the design of cogeneration facilities is the reliability of the individual units which are linked together to form the facility and the impact of the operation of one unit which would occur if a different unit was shut down for either scheduled maintenance or equipment failure. It is important that a stoppage, or a change in production rates, in one part of the cogeneration facility does not adversely affect the operation of another part of the facility. If a cogeneration facility is too highly integrated, then the overall operation of the facility becomes more complex and difficult and the operational reliability of the entire complex decreases.

A second factor which must be considered in the design of cogeneration facilities is the increased cost of linking the individual units of the facility compared to their erection and operation as separate units. The net advantage of the cogeneration facility must of course exceed these costs. A third factor, which is also related to economics, is the problem of monitoring and pricing the energy equivalents which are being transferred between the units of the cogeneration facility. It is therefore advisable that the units of the cogeneration facility are linked by a small number of process flow streams and that the flow rates and equivalent energy contents of these streams are easy to determine. This third factor is most relevant when parts of the facility are owned by different parties.

Most major petroleum refineries contain a unit referred to as a fluidized catalytic cracking unit. The function of this unit is to break down high molecular weight hydrocarbons into smaller, lower molecular weight hydrocarbons. A fluidized catalytic cracking unit, also referred to herein as an FCC unit, is therefore a way to upgrade heavy hydrocarbons to products having a higher economic value. A typical feed stream to an FCC unit is a gas oil, such as an atmospheric or vacuum gas oil, having an initial boiling point, as determined by the appropriate distillation method, above about 450° F. A lighter feedstock including material boiling at 400° F. or lower or a feedstock comprising a heavier hydrocarbon, such as a reduced crude or heavy vacuum gas oil, may also be fed to the FCC unit. An example of such a heavier feedstock would be a distillate containing 60 vol.% hydrocarbonaceous compounds having atmospheric boiling points, as determined by the appropriate standard test method, above 650° F. The products derived from the FCC unit typically include a sizable amount of naphtha, kerosene, and a slightly heavier fuel oil. These streams may then be finished to the established product specifications for gasoline, jet fuel, and diesel fuel, respectively. An FCC unit will also produce some heavier material and a sizable amount of lighter hydrocarbon including virtually all of the more common $C_5-$ acyclic hydrocarbons. These light hydrocarbons are separated and recovered along with some naphtha in a unit of the refinery referred to as a gas concentration unit. The gas concentration unit will often supply the refinery with one or more streams which are rich or at least have a high content in light olefins, such as ethylene and butylene, which are consumed in downstream alkylation or polymerization units to produce such products as high octane gasoline blending components and alkylaromatics including ethylbenzene.

An FCC unit comprises a reaction zone and a catalyst regeneration zone. In the reaction zone the feed stream is contacted with a finely divided fluidized catalyst maintained at elevated temperatures and a moderate positive pressure. This contacting causes the conversion of the feed stream to the more volatile products which are recovered from a vaporous effluent stream of the reaction zone and the accumulation of carbonaceous deposits referred to as coke on the catalyst. These deposits lessen the catalytic effectiveness of the catalyst. To overcome the activity reduction caused by the coke deposits, a stream of used catalyst is continuously removed from the reaction zone and transferred into the regeneration zone of the FCC unit. The entering catalyst joins a bed of fluidized catalyst retained within the regeneration zone and is contacted with a pressurized stream of air under a high temperature condition such that the carbonaceous deposits on the catalyst are combusted within the regeneration zone. This burning of the coke results in a reactivation or regeneration of the catalyst and also produces a very large amount of heat. Some of this heat may be removed from the regeneration zone in heat exchange, as by the generation of steam.

A sizable amount of the heat liberated by the combustion of the coke is removed from the FCC regeneration zone by the continuous withdrawal of a stream of hot regenerated catalyst, which is then passed back into the FCC reaction zone. This circulation of catalyst therefore serves the dual roles of supplying regenerated catalyst to reaction zone and supplying the required heat to maintain the desired cracking conditions within the reaction zone. Further details of the operation of an FCC unit may be obtained by reference to the previously cited references or to U.S. Pat. Nos. 4,197,189 and 4,198,287. Since the FCC unit performs a central role in the overall operation of the refinery, and since the operation of the regeneration zone is necessary for the operation of the reaction zone, it is extremely important to the overall operation of the refinery that a highly dependable means is used to supply compressed air to the FCC regneration zone.

It is an objective of the present invention to provide an air supply system for the catalyst regeneration zone of a fluidized catalytic cracking unit which is highly dependable and is readily integrated with a cogeneration facility. It is another objective of the present invention to provide a process for generating electrical power which combines the operation of the regeneration zone of an FCC unit and a turbine-driven generator. It is a further objective of the subject invention to provide a simple low-cost cogeneration process which links together a petroleum refinery and an electrical generating station.

The air supply to the regeneration zone of an FCC unit is usually produced through the use of either a centrifugal type or an axial type air compressor. This compressor may be driven by conventional means such as an electric motor or a steam driven turbine. These drivers are normally directly connected to the compressor in larger FCC units, and in smaller FCC units are connected to the compressor through the use of a one or more gear trains which adjust the rotational speed of the various components of the air supply system. The air supply stream to the regeneration zone will normally have a superatmospheric pressure less than about 60 psig. A preferred range of this pressure is from 25–55 psig. The very large amounts of air which are required result in a sizable utilities cost if this air compressor is driven by an electric motor or other conventional means. Therefore, it is becoming a common and predominant practice to have the air compressor in a large refinery driven by a power recovery unit which receives as its motive stream the flue gas stream of the FCC regeneration zone. These systems are described in the previously referred to references. Any reference herein to "small" or "smaller" FCC units is intended to indicate an FCC unit designed for a feed rate of less than about 25,000–30,000 barrels per day.

The flue gas stream which is removed from the regeneration zone has already passed through one or more separators located in the regeneration zone designed to remove the majority of the catalyst particles from the flue gas stream. However, it is normally necessary to pass the flue gas stream through at least one tertiary particle separation zone to further reduce the concentration of highly erosive fine catalyst particles prior to passage of the flue gas stream through the power recovery unit. Separators intended for this purpose are described in U.S. Pat. Nos. 2,941,621; 2,986,278; and 3,415,042. A power recovery expander is a turbine type device in which the flue gas stream is depressurized to a slightly superatmospheric pressure and which converts a portion of the energy stored in the hot pressurized flue gas stream to useful rotational power. The flue gas stream is then passed to the appropriate heat recovery facilities, pollution control facilities or directly to the stack where it is vented to the atmosphere.

When properly designed, installed and operated, the combination of a power recovery expander and either a centrifugal or axial air compressor is very dependable and will give long periods of uninterrupted service. However, since the air supply is so essential to the operation of the FCC unit which in turn is central to the operation of the refinery, it is a common practice to store at the refinery spare major machine components which may be rather quickly installed as replacement parts to minimize refinery downtime. The refinery would prefer, but heretofore could not economically justify, having an entire spare air compressor and driver which are not normally utilized but are present only as a standy-by system for the primary air compressor of the FCC unit.

In the subject invention, the power recovery expander is mechanically connected to the stand-by or auxiliary air compressor. The primary air compressor for the FCC regeneration zone is driven by a conventional driver and normally provides the air stream which is fed into the FCC regeneration zone. The pressurized air stream which is produced by the stand-by air compressor is sold "over the fence" to an electrical utility and used to generate electricity. The inventive concept therefore does not involve the generation of electricity at the refinery using the power recovery expander. The pressurized air stream supplied to the utility is heated and admixed with hot gases from conventional gas generators before being used to generate electricity at the utility company. If the primary air compressor fails due to either a problem with the driver or the compressor, then the pressurized air stream being produced by the stand-by air compressor, which is of course already running, is used as the air supply stream to the FCC regeneration zone. That is, the "spare" air compressor located at the refinery is always kept on stream rather than sitting idle. This is now an economically viable situation for the refinery due to the revenue received from the electrical utility.

The inventive concept is more fully illustrated by the Drawing, which shows the overall flow of a cogeneration facility utilizing the subject invention. That portion of the Drawing which is to the left of heat exchanger 24 is the refinery portion of the facility, with exchanger 24 and the portion of the Drawing to the right of it being the electrical utility portion of the facility. Air taken in through line 1 is pressurized in a compressor 2 driven by a motor or steam turbine 3. This produces a first pressurized air stream which is carried by line 4 and passed into line 6. This air stream is used to fluidize a stream of used catalyst descending through line 8 from an FCC reactor 41 and to pass the catalyst upward through line 9 into an FCC regenerator 10 wherein the catalyst is regenerated by the burning off of carbonaceous deposits on the surface of the catalyst. The intense burning which occurs within the FCC regenerator produces an extremely large quantity of heat. Some of this heat is removed with the regenerated catalyst which is drawn off the FCC regenerator through line 38, with this hot catalyst being contacted with a stream of a hydrocarbon distillate from line 39 which carries the regenerated catalyst upward through riser 40 into the main vessel of the FCC reactor 41. This contacting of the distillate with the regenerated catalyst at cracking conditions results in a significant reduction in the average molecular weight of the hydrocarbonaceous compounds forming the distillate. These lighter compounds are separated from the fluidized bed of catalyst which is maintained within the FCC reactor and passed to a product recovery zone through line 42.

A flue gas stream having a representative temperature of between 1200° F. and 1350° F. is removed from the FCC regenerator 10 to line 11. This flue gas stream has been separated from the fluidized catalyst contained within the regenerator through the use of particle separation means not shown but will normally still contain a significant amount of highly erosive catalyst particles. The great majority of these particles are removed from the flue gas stream in a tertiary particle recovery zone 12. The catalyst and catalyst fines removed in this high temperature separator are withdrawn through line 13 and a relatively particle free FCC regenerator flue gas stream is passed through line 14 to a power recovery expander 15. After being depressurized in the expander, the flue gas stream is then removed as an exhaust stream carried by line 16.

The power recovery expander 15 is coupled to a second air compressor 17 either directly or through a speed adjusting gear train. Air taken in through line 18 is pressurized in the second compressor to form a second pressurized air stream carried by line 19. The second pressurized air stream may have a pressure greater or lesser than the first pressurized air stream but preferably less than about 75 psig. The second pressurized air stream will normally flow through line 20 with flow control valve 21 in line 7 being in a closed position. Flow control valve 22 in line 20 is normally in an open position to allow all the second pressurized air stream to flow through an indirect heat exchanger 24 utilized as a recuperator of the electrical generating utility. The second pressurized air stream may be further heated at this point through the use of a supplemental combustor which receives fuel through line 43. The thus-heated second pressurized air stream is preferably combined with a high temperature gas stream carried by line 25 and passed into a turbine 27 through line 26.

The entering motive stream passes through the turbine and emerges as a turbine effluent stream having a relatively high temperature carried by line 29. The turbine is mechanically coupled to an electrical generator 28 which produces electrical power for residential or commercial customers of the electric utility company. Heat is recovered from the turbine effluent stream via indirect heat exchange against the second pressurized air stream in the recuperator 24. This also provides the desired heating of the air stream. The turbine effluent stream is then carried through an optional but preferred second indirect heat exchanger 31 and to the stack of the utility through line 29. In the heat exchanger 31, an additional quantity of heat is recovered by producing high temperature boiler feed water or steam carried by line 30. This steam or high temperature water may be delivered to the refinery section of the cogeneration process.

The high temperature gas stream which is eventually passed into the turbine 27 is preferably produced in a plurality of turbine type gas generators. A first gas generator 32 produces high temperature gas flowing through line 34 which is admixed with a second stream of high temperature gas carried by line 35 from a second gas generator 33. These two gas streams are combined to form a high temperature gas stream having a temperature of about 1300° F. carried by line 36. Preferably this gas stream is admixed with the heated second pressurized air stream carried by line 20. In an alternative embodiment of the invention, a portion or all of the high temperature gas stream flowing through line 36 may be passed into the turbine through line 37 at a different point than the heated pressurized air stream enters the turbine.

The second air compressor 17 which produces the second pressurized air stream carried by line 19 is the spare or stand-by compressor of the air supply system for the FCC regenerator 10. In the event of a failure of either the motor 3 or the compressor 2, which serves as the primary air supply compressor for the regeneration zone, the flow rate of air through lines 4 and 6 will decrease or the air flow in line 4 may stop entirely. This decrease in the flow rate of the first pressurized air stream through line 6 will be sensed by a flow indicator and control means 5 which will generate a signal transmitted through the signal carrying means 23 to the flow control valves 21 and 22. Upon receipt of the proper signal, flow control valve 22 will be moved toward a closed position and flow control valve 21 will be moved toward an open position. The valves and the flow control system are preferably designed to provide a variable diversion of air from line 19 into line 7 at the rate necessary to keep the air flow to the regenerator constant. Any deficiency in the flow rate of the first pressurized air stream through line 4 is thereby made up with air from line 7. The regenerator is thereby provided with an essentially uninterrupted supply of air and the failure of the primary air compressor would not cause an interruption in the operation of the refinery.

Those familiar with the design and operation of FCC units are cognizant of the fact that one or more check valves not shown in the Drawing are normally present in the air supply system of the regenerator. These simple flapper type valves would be present in either or both lines 4 and 6. The purpose of these valves is to prevent catalyst backup into the air compressor if the air compressor is suddenly shut down. It is preferred that an additional check valve is placed in line 7. This valve would prevent catalyst backup into lines 19 or 20. In addition this valve would automatically control the air flow in line 7. If the primary compressor 2 was shut down, this valve would allow air to enter line 6 from line 7. However, in normal operation with a higher pressure downstream the valve would not allow air to flow into line 7 from line 4.

One embodiment of the invention may be characterized as a cogeneration process which comprises the steps of contacting a feed stream comprising hydrocarbonaceous compounds having an atmospheric boiling point above 350° F. with a particulate catalyst within the reaction zone of a fluidized catalytic cracking unit; passing used catalyst into the catalyst regeneration zone of the fluidized catalytic cracking unit from the reaction zone; compressing air in a first compressor and forming a first air stream which is passed into the catalyst regeneration zone of the fluidized catalytic cracking unit for use in burning carbon present on the catalyst within the catalyst regeneration zone; passing a flue gas stream, which is removed from the regeneration zone of the fluidized catalytic cracking unit, and which comprises nitrogen and carbon dioxide through a power recovery expander in which the flue gas stream is depressurized, and thereby generating motive force which is used to drive a second compressor, with the second compressor producing a pressurized second air stream having a superatmospheric pressure; heating the second air stream by indirect heat exchange against a hereinafter characterized turbine effluent stream; and passing the second air stream and a high temperature gas stream through a turbine which drives an electrical generator and thereby producing said turbine effluent stream.

The inventive concept has advantages as a cogeneration process and also to the individual refinery and utility. The overall process requires a minimum of additional capital investment compared to the individual refinery and power generation station. There is only a single tie-in between the refinery and the power plant, with the overall flow being simple and providing a minimum number of flow control problems. Furthermore, each unit of the cogeneration facility may operate entirely independently of the other component of the facility. An advantage which is specific to the refinery is the fact that the spare air compressor for the FCC regeneration zone is on-stream and available when needed. This assures the refinery that there will be no operational problem or extended lag time in the startup of the spare air compressor. A second advantage to the refinery is that the expensive capital equipment represented by the spare air compressor and its accessories is being fully utilized in a profit generating capacity rather than sitting idle. The utility is benefited since it receives a motive stream which may be used to generate electricity thereby reducing the overall fuel consumption at the utility. Further, the heated air of this motive stream is pollution free when discharged to the atmosphere, thereby lowering the total potential discharge of atmospheric pollutants from the utility.

In order for the refiner to utilize the subject invention, it is of course necessary for the primary air compressor to be linked to its drive means and for the secondary air compressor to be linked to the power recovery expander through suitable mechanical drive trains. It is also necessary to provide the necessary air flow conduits which interconnect the outlets of each of the air compressors to the line which feeds the air into the regeneration zone. This linkage is preferably similar to that shown in the Drawing. It is also preferred that a flow control system is provided which automatically terminates the flow of the pressurized air stream produced by the stand-by air compressor to the utility when this air is required for use in the FCC regenerator. A flow control system such as that shown in the Drawing may be utilized for this purpose although those skilled in the art may design alternative flow control systems. This flow control system monitors the rate at which air is supplied to the regeneration zone and either partially or totally restricts the opening through the valve which controls the flow of the air from the refinery to the utility. Other control systems normally used on equipment of this nature, such as expander speed control systems, will also be present.

In accordance with this description, one embodiment of the invention may be characterized as an air supply system for an FCC catalyst regeneration zone which comprises a first air compressor operably connected to a first drive means; a second air compressor operably connected to a second drive means which comprises a flue gas power recovery expander which receives as its motive stream the flue gas of a catalytic regeneration zone of an FCC unit; a turbine operably connected to an electrical generator; a first air duct means connecting the outlet of the first air compressor to the air inlet of the catalyst regeneration zone; a second air duct means connecting the outlet of the second air compressor to the turbine; a third air duct means connecting the first air duct means and the second air duct means and a flow control means comprising a valve means selectively capable of restricting air flow in the second or the third air duct means and also including a control means which activates the valve means if the first air compressor fails to supply sufficient air to the catalyst regeneration zone through the first air duct means.

The pressurized air stream produced in the supplemental air compressor is heated from its normal temperature of about 350°–450° F. by indirect heat exchange. Preferably, this is by heat exchange against the effluent of the turbine used in the utility but it could be heated by heat exchange against some other high temperature stream such as the effluent of a reaction zone. The thus-heated pressurized air stream should have a temperature in the range of from about 825° F. to about 925° F. The pressurized air stream is then preferably admixed with a hot gas stream having essentially the same pressure as the air stream but having a much higher temperature. The temperature of the high temperature gas stream will normally be on the order of about 1250°–1350° F. The motive stream formed by the admixture of the pressurized air stream and the hot gas stream will preferably have a temperature between 1100° and 1200° F. and is passed directly into the turbine or gas expander which is coupled to a base load generator of the power plant through a suitable drive train. The effluent stream of the turbine may have a temperature between about 850° F. and 950° F.

The hot gas stream which is eventually charged to the turbine of the utility is preferably produced from two or more aircraft derivative gas generating units (jet engines). These gas generators may be fueled with a relatively clean fuel such as jet fuel, natural gas or a synthetic gas produced in the refinery. It is necessary to judiciously match the power delivered by the pressurized air stream and by the hot gas streams to provide an acceptable overall power station thermal efficiency. The hot gas generators should supply a gas stream which has a flow rate at least two to three times greater than the flow rate of the second pressurized air stream fed to the utility. In a typical large refinery, the power recovery expander may be rated at between 15–20 megawatts, and the hot gas generators would then preferably be rated at a total power output of at least 30–40 megawatts.

Although it is somewhat specialized equipment, it is believed that all of the equipment needed to practice the invention is readily available from commercial suppliers.

In the subject process, the power recovery expander is not available to drive the primary FCC air compressor. It is therefore necessary to provide a full-time drive means for the primary compressor. This may be an electric motor, a steam turbine or a fuel combusting turbine. Another alternative is to provide a steam turbine for startup and use an electric motor as the on-stream drive means. The steam turbine could receive as its motive stream steam produced by cooling the FCC regenerator flue gas stream. The stream may also be heated, preferably to a temperature over 500° F., or steam having a temperature above 500° F. could be produced by indirect heat exchange within the catalyst regeneration zone of the FCC unit. It is anticipated that FCC units which receive heavier feed streams, such as reduced crudes, would be more likely to operate in this manner due to the higher carbon loadings which accumulate on the used catalyst.

Another embodiment of the invention is the utilization of a supplemental direct combustor to heat all or a portion of the heated air stream which exits the recuperator 24. This combustor, which may be similar to the type used on gas turbines, would use the heated pressurized air to burn a fuel such as natural gas or jet fuel. This would further heat the air up to about 900° F. to about 1150° F. This embodiment would be particularly advantageous when the hot gas generators are throttled back and the temperature of the hot gas-heated air admixture fed to the power generating turbine would otherwise be decreased. The supplemental combustor would instead keep the temperature of the gas entering the turbine relatively high thereby increasing the efficiency of the power generating process.

I claim as my invention:

1. A process for generating electrical power which comprises the steps of:
   (a) producing a pressurized air stream by compressing air to a superatmospheric pressure in a compressor driven by a power recovery expander which receives as a motive stream the flue gas stream of the catalyst regeneration zone of a fluidized catalytic cracking unit;
   (b) heating the pressurized air stream by indirect heat exchange; and,
   (c) passing the pressurized air stream and a high temperature gas stream through a turbine which drives an electrical generator and thereby producing a turbine effluent stream.

2. The process of claim 1 further characterized in that the pressurized air stream is heated by indirect heat exchange in step (b) against the turbine effluent stream.

3. The process of claim 2 further characterized in that the high temperature gas stream is produced by one or more turbine-type gas generators.

4. The process of claim 3 further characterized in that the pressurized air stream is admixed with the high temperature gas stream.

5. An air supply system for the catalyst regeneration zone of a fluidized catalytic cracking unit which comprises:
   (a) a first air compressor operably connected to a first drive means;
   (b) a second air compressor operably connected to a second drive means which comprises a flue gas power recovery expander which receives the flue gas of a catalyst regeneration zone of a fluidized catalytic cracking unit;
   (c) a turbine operably connected to an electrical generator;
   (d) a first air duct means connecting the first air compressor to the catalyst regeneration zone;
   (e) a second air duct means connecting the second air compressor to the turbine;
   (f) a third air duct means connecting the first air duct means and the second air duct means; and, (g) a flow control means comprising a valve means selectively capable of restricting air flow in the second or the third air duct means and also including a control means which activates the valve means if the first air compressor fails to supply sufficient air to the catalyst regeneration zone through the first air duct means.

6. The air supply system of claim 5 further characterized in that a high temperature gas generating means is also operably connected to the turbine.

7. A cogeneration process which comprises the steps of:
(a) contacting a feed stream comprising hydrocarbonaceous compounds having an atmospheric boiling point above 350° F. with a particulate catalyst within the reaction zone of a fluidized catalytic cracking unit;
(b) passing used catalyst into the catalyst regeneration zone of the fluidized catalytic cracking unit from the reaction zone;
(c) compressing air in a first compressor and forming a first air stream which is passed into the catalyst regeneration zone of the fluidized catalytic cracking unit for use in burning carbon present on the catalyst within the catalyst regeneration zone;
(d) passing a flue gas stream, which is removed from the regeneration zone of the fluidized catalytic cracking unit, and which comprises nitrogen and carbon dioxide through a power recovery expander in which the flue gas stream is depressurized, and thereby generating motive force which is used to drive a second compressor, with the second compressor producing a second air stream having a superatmospheric pressure;
(e) heating the second air stream by indirect heat exchange against a hereinafter characterized turbine effluent stream; and,
(f) passing the second air stream and a high temperature gas stream through a turbine which drives an electrical generator and thereby producing said turbine effluent stream.

8. The process of claim 7 further characterized in that the second air stream is admixed with the high temperature gas stream and then passed into the turbine.

9. The process of claim 8 further characterized in that the first compressor is driven by steam which is heated within the catalyst regeneration zone of the fluidized catalytic cracking unit.

10. The process of claim 8 further characterized in that the first compressor is driven by steam produced by indirect heat exchange performed within the catalyst regeneration zone of the fluidized catalytic cracking unit.

11. The process of claim 10 further characterized in that at least 60 vol.% of the feed stream has an atmospheric boiling point above 650° F.

12. The process of claim 8 further characterized in that heat is removed from the regeneration zone of the fluidized catalytic cracking unit through the production of steam having a temperature above 500° F. and at least a portion of this steam is used to drive the first compressor.

13. The process of claim 8 further characterized in that the second air stream is heated after the indirect heat exchange of step (e) by direct combustion with an added fuel and is then admixed with the high temperature gas stream.

* * * * *